United States Patent [19]

Armstrong et al.

[11] Patent Number: 5,126,611
[45] Date of Patent: Jun. 30, 1992

[54] COMPOSITE SUPERCONDUCTOR DISC BEARING

[75] Inventors: Timothy R. Armstrong, Palos Verdes Estates; John R. Esopa, Hermosa Beach; Thomas K. Rigney, II; Marshall P. Saville, both of Torrance, all of Calif.

[73] Assignee: Allied-Signal Inc., Morris Township, Morris County, N.J.

[21] Appl. No.: 652,341

[22] Filed: Feb. 6, 1991

[51] Int. Cl.$^5$ .................. H02K 21/06; F16C 39/06; H02N 15/04
[52] U.S. Cl. ........................ 310/90.5; 505/1; 505/876
[58] Field of Search .............. 310/90.5; 505/733, 876

[56] References Cited

U.S. PATENT DOCUMENTS 4,797,386 1/1989 Gyorgy et al. .
4,892,863 1/1990 Agarwala ............... 310/90.5
4,954,481 9/1990 DeReggi et al. ............ 505/1
4,975,415 12/1990 Gusman et al. ............ 505/1

OTHER PUBLICATIONS

Defense Technical Information Center Superconducting Bearing and Levitation Newsletter, No. 1 Mar. 1990, Francis C. Moon, Editor.

Primary Examiner—Steven L. Stephan
Assistant Examiner—D. L. Rebsch
Attorney, Agent, or Firm—David B. Abel; Robert A. Walsh

[57] ABSTRACT

A Type II ceramic superconductor is dispersed in an acrylic thermoplastic carrier in a ratio between 1:1 and 3:1. Resulting is a readily formable, thermosetting superconductor composite. The superconductor composite is particularly useful as a magnetic bearing or for fabricating devices to contain magnetic flux, because of its "flux pinning" effect.

17 Claims, 6 Drawing Sheets

COMPOSITE SUPERCONDUCTOR DISC BEARING

The invention was made with Government support under Contract No. N00014-88-C-0668, awarded by the Department of the Navy. The Government has certain rights in this invention.

BACKGROUND OF THE INVENTION

This invention relates in general to superconducting composite materials and in particular to a superconducting bearing composed of a matrix of acrylic thermoplastic and superconducting powder.

The Meissner effect is the expulsion of applied magnetic flux to a superconductor. With Type I superconductors, there is a complete Meissner effect with total expulsion of applied magnetic flux. Type II superconductors are those which have a significantly higher temperature at which they exhibit superconductivity, $T_c$. However, the Type II superconductors exhibit a partial Meissner effect combined with a "flux pinning" effect, wherein a portion of a magnetic field placed proximate the Type II superconductor does penetrate the superconductor, and is essentially fixed in place.

High-temperature Type II superconductors are potentially important for a variety of applications such as electrical conductors, shields of magnetic flux, field induced magnets, and passive magnetic or flux trapping bearings. For the flux shield, magnets, and bearing applications, the superconductor may need to be fabricated into a wide variety of shapes and sizes. These shapes can range from simple discs to more complex forms. However, to optimize the properties necessary for these applications, the superconductor material must be processed to promote the formation of long, aligned grains. This type of processing is not readily conducive to the fabrication of even simple shapes. Therefore, a novel approach to fabricating high-temperature superconductors is needed.

BRIEF SUMMARY OF THE INVENTION

The present invention is directed to a method of producing a Type II ceramic superconductor, dispersed in an acrylic thermoplastic carrier, to yield a readily formable, thermosetting superconductor composite. The superconductor composite is particularly useful as a magnetic bearing or as devices to trap or shield magnetic flux.

DETAILED DESCRIPTION OF THE PREFERRED EMBODIMENT

Figure 1:
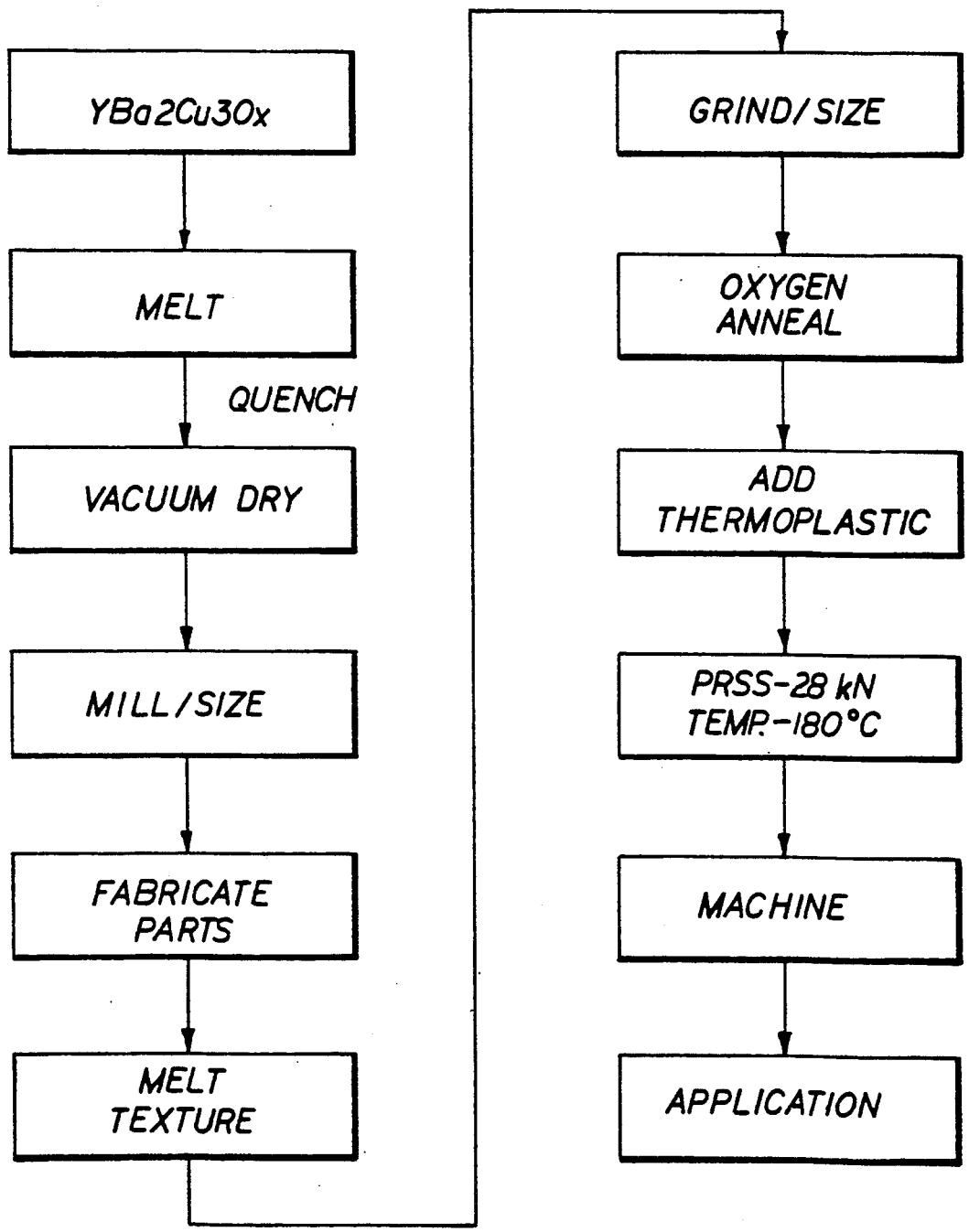
FIG. 1 depicts a flow chart of the process steps of formulating the superconducting composite of the present invention.

The process steps required to formulate the superconductor composite are shown in FIG. 1. A superconducting ceramic precursor material, such as $YBa_2Cu_3O_{7-x}$ powder, is first melted at temperatures in the range 1300° to 1400° for 5-10 minutes. The melt is then rapidly quenched to solidify the material in a homogeneous subatomic lattice. This may best be accomplished by pouring the melted material over copper plates that are cooled to liquid nitrogen temperatures (77° K.). The quenched $YBa_2Cu_3O_{7-x}$ material is a black, brittle amorphous solid. This solid is then vacuum dried to remove any moisture that has condensed on the surface. Next, the amorphous solid is ground to a fine powder with an average particle size which is preferably not greater than 175 microns. The fine powder is then pressed into bulk shapes such as disks or cylinders and subsequently melt textured in a heat treating process.

The melt texturing heat treatment consists of heating the pressed material to temperatures above the liquidus temperature. For the $YBa_2Cu_3O_{7-x}$ superconducting material, the liquidus temperature is about 1030° C. thus, the melt texturing is carried out at between 1050° C. to 1275° C. The material is held at the melt temperature for a time period sufficient to allow liquid to form, generally at least 20 minutes.

The material is then cooled at an initial rate of approximately 100° C./hour to a temperature of about 1000° C. This relatively rapid step is followed by a controlled cooling, where the cooling rate is adjusted to be no greater than about 10° C./h until the material is cooled to 900° C. This slow cooling promotes the growth of relatively long grains, i.e. grains having a length greater than 1mm. This process can also be adapted to promote the growth of uniformly sized grains having any desired length up to slightly greater than 1cm. Thus, as discussed, below an optimal grain size which can be then ground to a preferred particle size, for example about 0.7 mm (700 microns), can be obtained by a adjusting the combination of initial melt temperature and cooling rate factors The material is then cooled at a rate of 60° C./h to a temperature of about 625° C., at which point the cooling rate is lowered to 10° C./h. This lower cooling rate is maintained until the material temperature reaches about 375° C., to allow the material to transform from the tetragonal to the orthorhombic crystal structure. The material is then cooled to room temperature.

The melt textured solid superconductor is then ground to a fine powder, having a particle size distribution between 20 microns and 1mm in size. The optimal size of the resulting ground particles, is believed to be in the range of between 600 to 800 microns. The superconductor powder is then sized by sieving through gradated screens.

The heat treated and sized superconductor powder is next annealed in a second heat treatment carried out in an oxygen atmosphere. It is preferred to anneal the sized powder, as opposed to the bulk textured material, because of the higher surface area of the ground powder. During this annealing process, the material is heated slowly in the oxygen atmosphere to a temperature in the range of between 400° C. to 800° C. and maintained at this temperature for 24 to 96 hours, preferably about 48 hours, to allow oxygen to diffuse into the material structure. This oxygen annealing step aids the transformation of the $O_{7-x}$ crystalline structure. The material is then cooled at a rapid rate such as 200° to 300° C./hour, to room temperature.

The sized, annealed superconductor powder is subsequently mixed with a polymer such as an acrylic thermoplastic in the ratios 1:1 to 3:1. The sized superconducting powders may be selected to have an approximately uniform particle size, or alternatively, a selected gradation, combination, or distribution of particle sizes may be optimal.

The acrylic thermoplastic such as methyl methacrylate, is selected as having a resistance to degradation, either by cracking or decomposing, which is maintained when cooled to a temperature less than the Tc of the selected superconductor material. The superconductor-acrylic composite mixture is ball milled with zirconia balls for 5 to 20 minutes to promote uniform wetting of the superconductor particles and insure a homogeneous distribution of acrylic and superconductor. The mixture is placed or injected into a mold of a press, and compacted under approximately 28kN of pressure at a temperature of about 180° C. for approximately nine minutes. The sample is allowed to cool for three minutes and is then removed from the press. The result is a two-phase composite structure that combines the flux exclusion and flux pining properties of the superconductor (when cooled to a temperature below the superconductors' Tc) with the toughness and flexibility of a polymeric material. However, since the superconductor material is not continuous through the sample, the composite will not exhibit the zero resistance to electrical current property of a pure superconductor.

The resulting composite structures are easily machined, if required, and can withstand cryogenic temperatures without brittle fracture. It should be noted that the final molding and pressing of the composite material can be carried out to produce a bulk material having a gross net shape in any injection moldable configuration.

Figure 2:
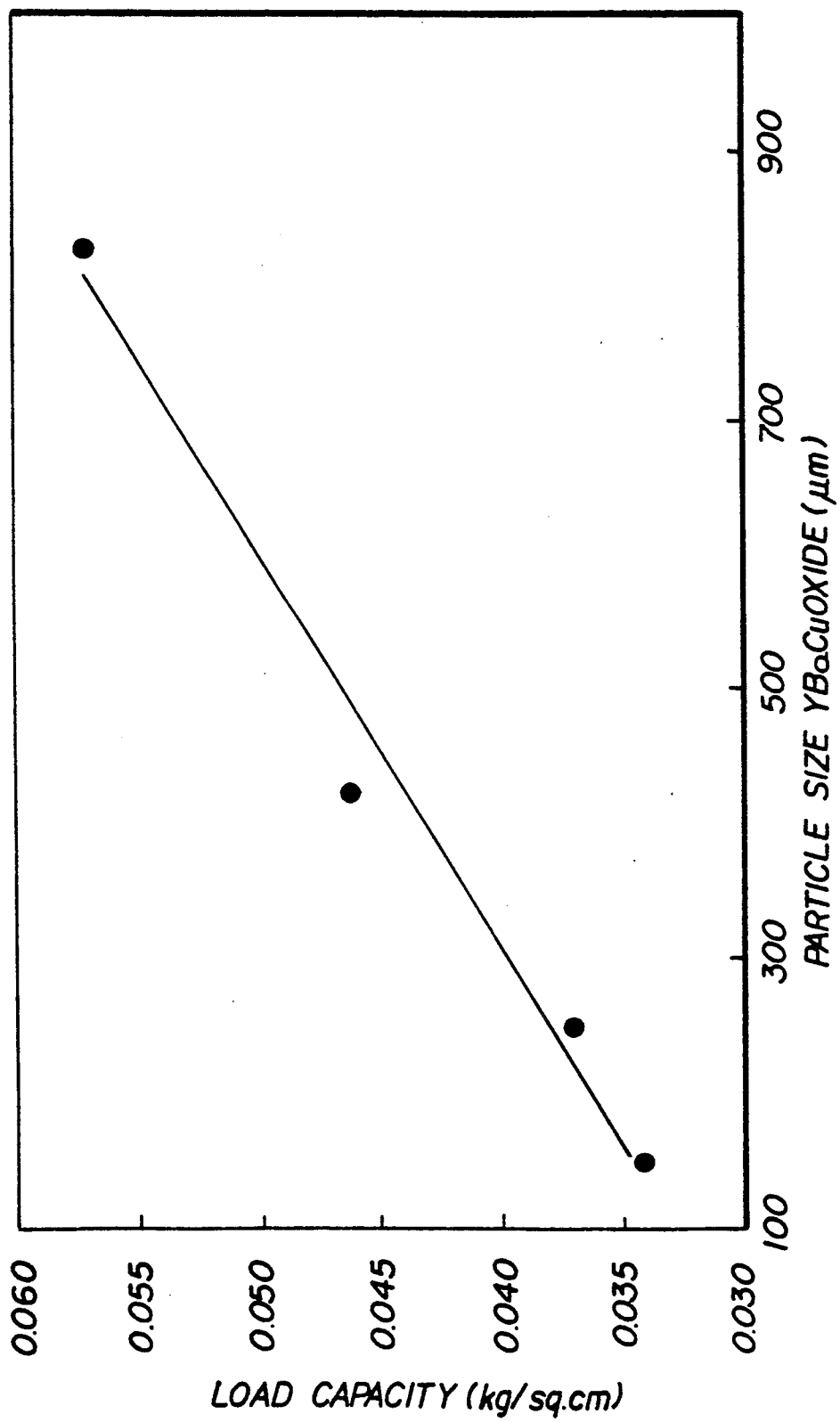
FIG. 2 is a graph plotting particle size as a function of bearing load capacity.

FIG. 2 is a graph plotting particle size on the X-axis and bearing load capacity on the Y-axis for the superconductor composite formulated according to the above procedure using a $YBa_2Cu_3O_7$ superconductor material. The data for the graph was generated using 70% by volume of superconductor and 30% by volume acrylic thermoplastic. The graph suggests an increased load capacity as a function of particle size occurs when the particle size increases, particularly for particle sizes in the range of between about 600 and 800 microns.

Figure 3:
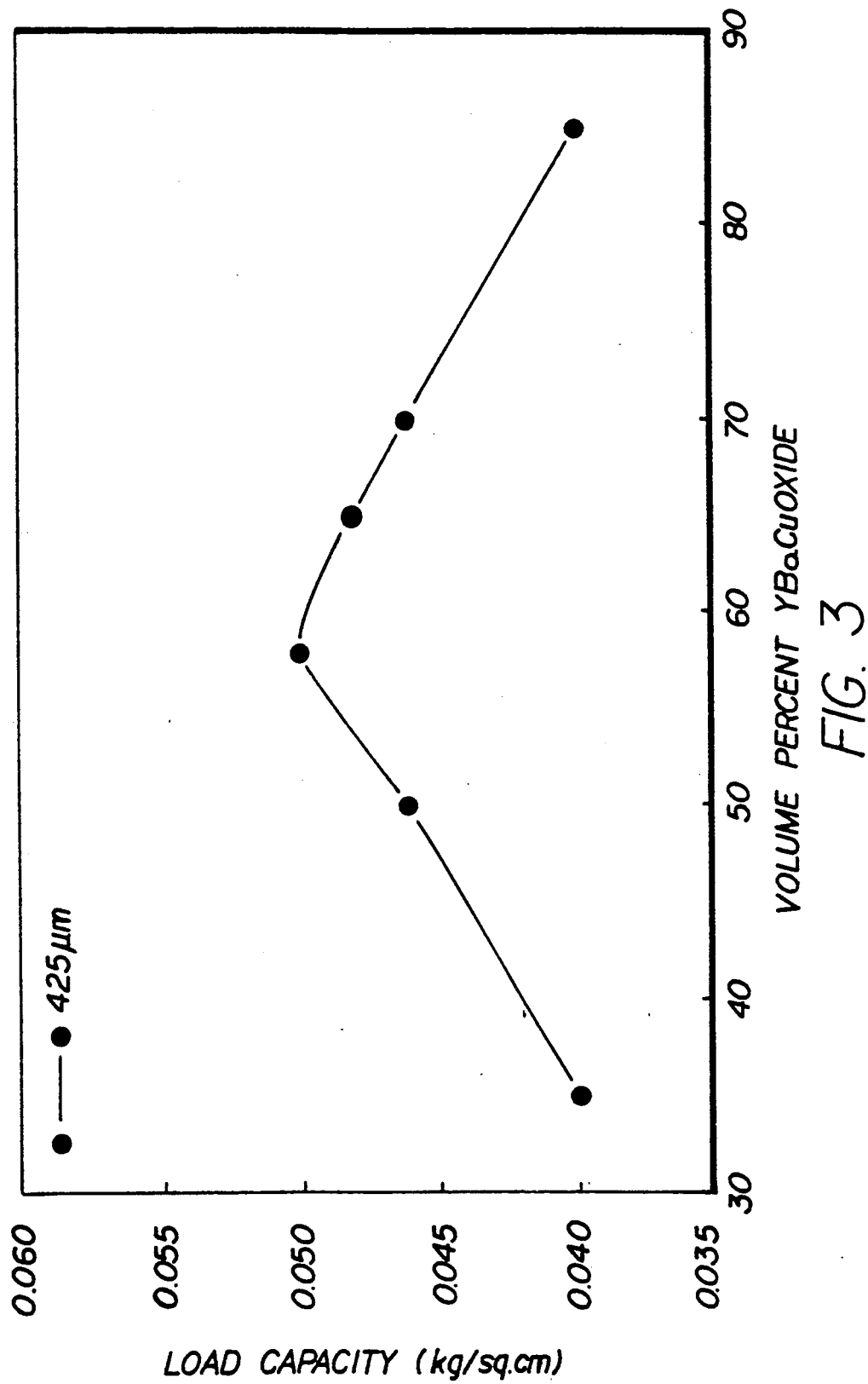
FIG. 3 is a graph plotting volume percentage of superconductor in the composite as a function of bearing load capacity.

FIG. 3 is a graph plotting volume percentage of superconductor in the composite on the X-axis and bearing load capacity on the Y-axis for the superconductor composite formulated according to the above procedure using a $YBa_2Cu_3O_7$ superconductor material. The data for this graph was generated using a mean particle size of 425 microns. The graph indicates that the bearing load capacity increases as the volume percentage of superconductor material is increased up to between fifty five to sixty percent. Surprisingly however, the bearing load capacity actually decreases when the percentage of superconductor material is further increased. Thus, for the $YBa_2Cu_3O_7$ superconductor based composite, the preferred volume percentage of superconductor is in the range of between about fifty to seventy percent, and optimally between about fifty five to sixty percent. It is currently believed that this is the preferred range required to minimize the amount of acrylic thermoplastic yet still hold the superconductor particles together. Samples made with lower amounts of acrylic do not hold together as well, tending to deteriorate with time.

The phenomena of a maximum load bearing capacity for the superconductor composite may result from two factors. First, a pure type II superconductor exhibits both partial magnetic flux exclusion and magnetic "flux pinning". Flux pinning is the result of a magnetic field being induced into the superconductor, and the resistance to change or displacement of this induced magnetic field's in the superconductor combined with the resultant external magnetic field. The superconductor particles in the superconductor composite also exhibit both the flux exclusion and flux pinning properties. A portion of the magnetic flux can be visualized as penetrating the composite's acrylic matrix along the magnetically invisible acrylic thermoplastic between the discreet superconductor particles held in the acrylic matrix. This magnetic flux traversing through the acrylic matrix is at least partially excluded from penetrating the superconductor particles, while also inducing flux pining in the particles. The interaction of these two phenomena between and about the superconducting particles in the acrylic matrix changes the nature of the magnetic field internal to the composite, potentially increasing the flux pining property as viewed from a position external to the superconductor composite.

The second aspect concerns the magnetic fields established in the superconductor particles to support the flux pining magnetic fields. In the composite superconductor, the acrylic matrix acts to separate the superconducting particles. Thus, the magnetic fields are constrained in the individual superconducting particles, polarizing the individual particles with the axes of polarity being all generally in alignment along the magnetic field lines of the inducing magnetic field.

Figure 4:
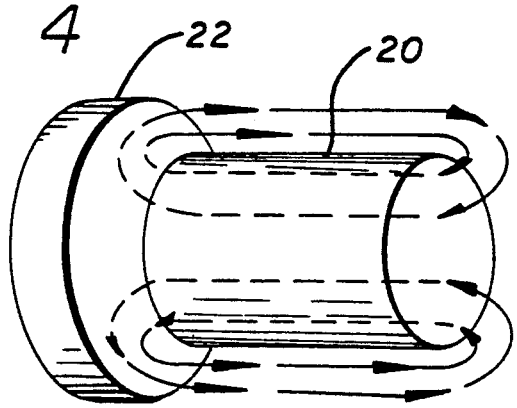
FIG. 4 depicts a simplified cross section of a magnet levitated with respect to a superconducting composite disk.

FIG. 4 depicts a bearing design which utilizes the inherent characteristics of a Type II superconductor composite to create a bearing design that supports both the axial and the radial loads of a rotating shaft. Type I superconductors as well as conventional passive magnetic bearings have been shown to have rotor stability problems often requiring sophisticated positioning and stabilizing electronics. For the present bearing design, however, Type II superconductor composites formulated according to the above process, such as $YBa_2Cu_3O_{7-x}$ dispersed in an acrylic thermoplastic, exhibit only a partial Meissner effect since some of the applied magnetic flux becomes pinned in the matrix when the temperature is reduced below the superconductors critical temperature $T_c$ (for $YBa_2Cu_3O_{7-x}$, (77° K.) This magnetic flux pinning in the superconductor composite bearing disk generates a bearing having a high magnetic stability.

As depicted schematically in FIG. 4, a rare earth cylindrical magnet 20, having a magnetic field aligned with the axis of the magnet 20, is positioned near the flat surface of a superconductor composite disk 22. The disk 22 is chilled (before or after the magnet is drawn near) to below the critical temperature $T_c$ of the superconductor. As would be expected, the magnet 20 is levitated above the surface of the disk 22. The magnet 20 can be easily made to spin on its axis with very little resistance for essentially any orientation of the magnetic axis except parallel to the plane of the surface of the disk 22. In addition, the magnet 20 exhibits a resistance to both axial and radial applied forces. The low resistance to rotation and relatively high axial and radial force resistance is attributed to flux exclusion and flux pinning within the superconductor composite disk 22, and the orientation of the magnetic field of the magnet 20 with respect to the superconductor composite disk 22. When the magnetic pole of the cylindrical magnet 20 is angled toward the surface of the disk 22, the magnetic field which penetrates and is pinned in the disk 22 is symmetrical and constant for any angular position of the magnet 20 about its magnetic axis. Thus, rotation of the magnet 20 about its magnetic axis does not alter the magnetic flux which is pinned in the superconducting material of the disk 22. However, translation of the magnet 20 in either the radial or axial direction with respect to the disk 22 will result in a change in the magnetic flux distribution which is pinned in the superconducting material of the disk 22. The pinned magnetic flux will also resist a change in the orientation of the magnetic axis. Since the Type II superconductor resists any change in a pinned magnetic flux, the flux pinning will produce a resisting force countering either axial or radial motion of the magnet 20, in effect aiding the Meissner effect thrust exclusion which produces a majority of the axial load resistance capability.

Figure 5:
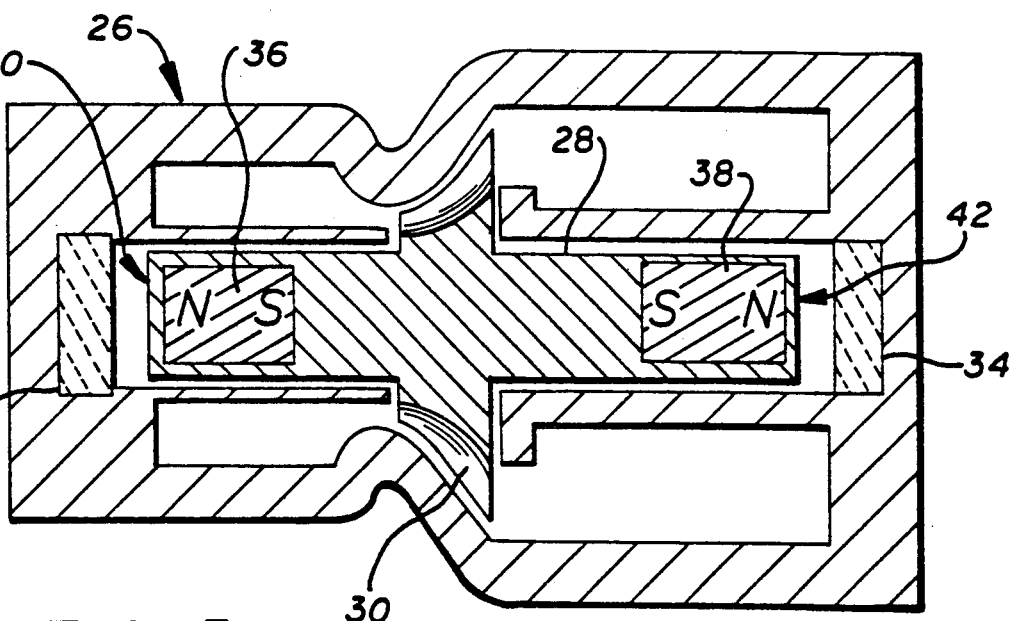
FIG. 5 depicts a bearing design utilizing a superconductor composite fabricated according to the method of FIG. 1.

These phenomena allow the design and construction of a magnetic bearing system 26 as depicted in FIG. 5. The magnetic bearing system 26 supports rotors 28, which may include, for example, rotating compressors and/or turbines 30. The bearing system 26 as depicted consists of two $YBa_2Cu_3O_7$ superconductor-acrylic composite disks 32, 34, which are 0.6 cm thick by 1.8cm in diameter, and are chilled to below (77° K.). The rotor 28, includes a pair of 18 Mega-Gauss Oersted (MGO), samarium-cobalt magnets 36, 38, one of which is inserted into one end 40 of the rotor 28, and the second magnet 38 is attached to the other end 42 of rotor 28. The rotor 28 is placed between the composite disks 32, 34 with a gap between the magnets 36, 38 and the composite disks 32, 34 respectively, of 0.025 to 0.05 centimeters. The rotor 28 intrinsically levitates horizontally or vertically between the two composite disks 32, 34.

To observe the rotor-dynamic characteristics of the bearing system 26, a jet of helium gas was placed near the off-center turbine 30 to spin the rotor 28. As the rotor 28 begins to rotate, there was a slight wobble at slow speeds due to low frequency rotor unbalance forces. The unbalance forces were attenuated by the radial stiffness of the bearing system 26, and the rotor 28 remained in a stable position. As the rotational speed increased, the rotor stabilized in the axial and radial directions. This excellent stability is a result of the radial stiffness that is low enough to filter out high frequency unbalance forces, yet high enough to control low-frequency unbalance forces.

Figure 6:
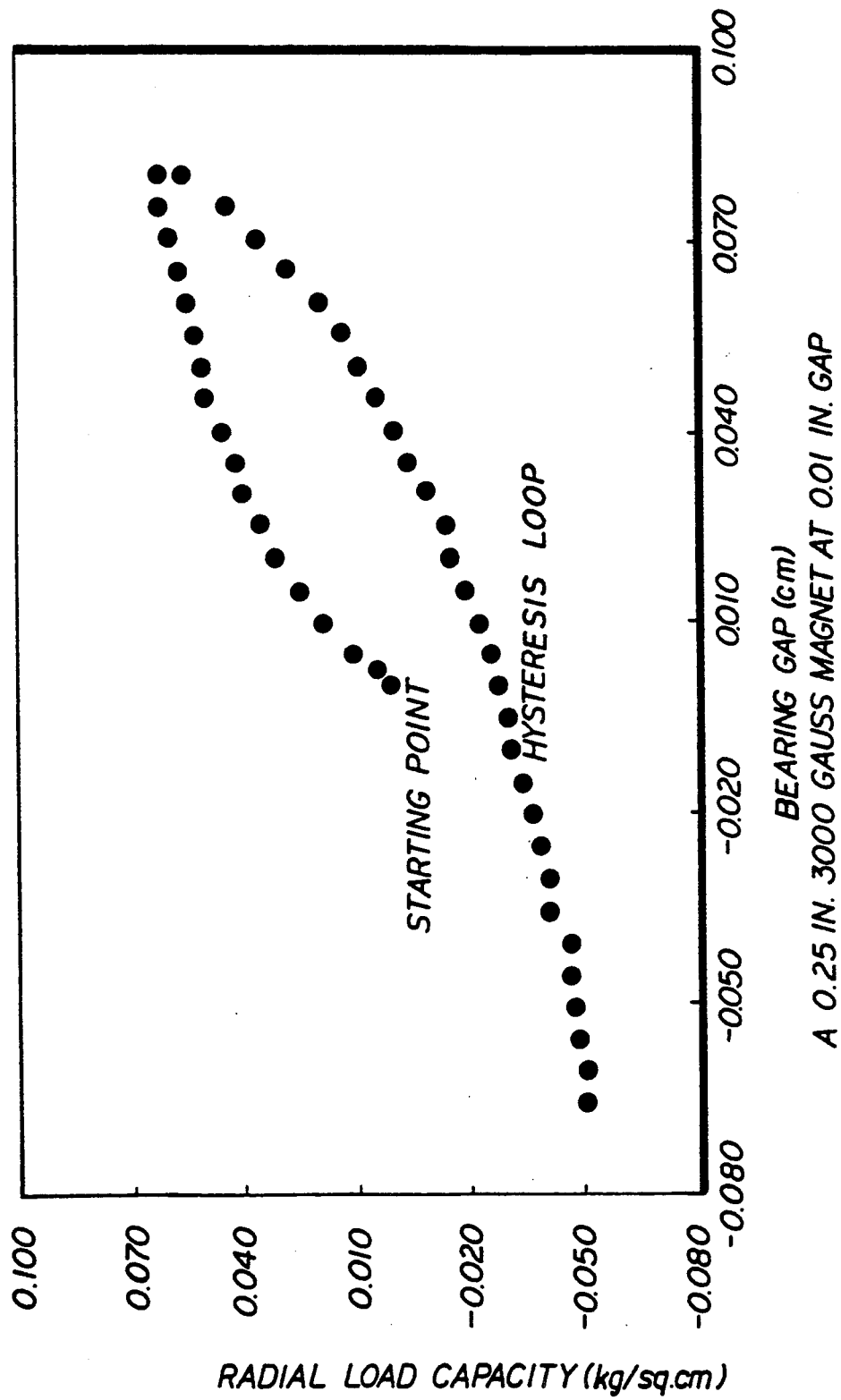
FIG. 6 is a graph plotting the radial load capacity of the bearing design of FIG. 4.
Figure 7:
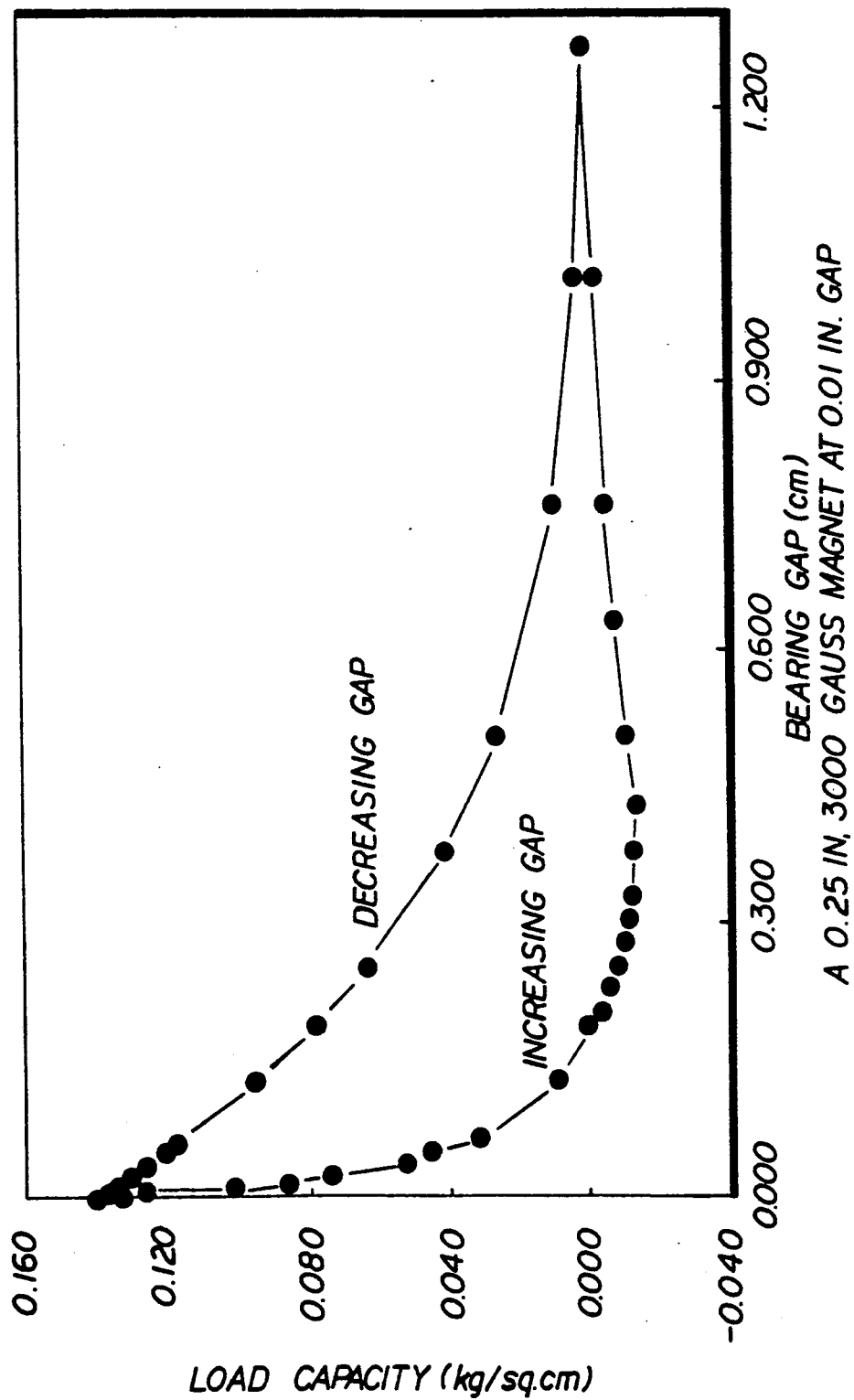
FIG. 7 is a graph plotting the axial thrust load capacity of the bearing design of FIG. 6.

A plot of the radial (perpendicular to shaft axis) load capacity of the bearing system 26 is shown in FIG. 6. A graph of the axial (parallel to shaft axis) thrust load capacity of the bearing system 26 is shown in FIG. 7. The axial stiffness was measured at 0.34 kgf/cm$^2$ per bearing for a 0.05 cm. gap.

It should be evident from the foregoing description that the present invention provides advantages in the fabrication and use of superconductors in magnetic bearing applications. Although preferred embodiments are described herein, it will be appreciated that many modifications and variations of the present invention are possible in light of the above teaching. Therefore, the scope of the present invention is limited only by the appended claims.

We claim:

1. A magnetic bearing system comprising:
   a pair of relatively rotatable members;
   a disk of superconducting composite having a ceramic superconductor powder and an acrylic thermoplastic blended in a ratio between 1:1 and 3:1 by volume, said disk attached to one of said relatively rotatable members; and
   means for generating a magnetic field symmetric about the axis of rotation of said relatively rotatable members, said means attached to the second of said relatively rotatable members and proximately positioned with respect to a major surface of said disk of superconductor composite.

2. The magnetic bearing system of claim 1, wherein said superconductor composite has a volume percentage of said ceramic superconductor in the range between about fifty and seventy percent of said superconductor composite.

3. The magnetic bearing system of claim 1 wherein said ceramic superconductor powder has a median particle size in the range between 600 and 800 microns.

4. The magnetic bearing system of claim 1 wherein said ceramic superconductor powder is yttrium-Barium-Copper-Oxide having an atomic formula $YBa_2Cu_3O_7$ and a particle size distribution of between 20 microns and 1mm in size.

5. The magnetic bearing system of claim 4, wherein said superconductor composite has a volume percentage of said ceramic superconductor in the range between about fifty five and sixty percent of said superconductor composite.

6. The magnetic bearing system of claim 4 wherein said ceramic superconductor powder has a median particle size in the range between 600 and 800 microns.

7. The magnetic bearing system of claim 1, wherein said acrylic thermoplastic is methyl methacrylate.

8. The magnetic bearing system of claim 1, further comprising:
   a second disk of superconducting composite having a ceramic superconductor powder and an acrylic thermoplastic blended in a ratio between 1:1 to 3:1 by volume, said second disk attached to the same one of said relatively rotatable members as said other disk; and
   second means for generating a magnetic field symmetric about the axis of rotation of said relatively rotatable members, said second means attached to the second of said relatively rotatable members and proximately positioned with respect to a major surface of said second disk of superconductor composite.

9. The magnetic bearing system of claim 8, wherein said disks of superconductor composite have a volume percentage of said ceramic superconductor in the range between about fifty and seventy percent of said superconductor composite.

10. The magnetic bearing system of claim 8 wherein said ceramic superconductor powder has a median particle size in the range between 600 and 800 microns.

11. The magnetic bearing system claim 8 wherein said ceramic superconductor powder is Yttrium-Barium-Copper-Oxide having an atomic formula $YBa_2Cu_3O_7$ and a particle size distribution of between 20 microns and 1mm in size.

12. The magnetic bearing system of claim 11, wherein said superconductor composite has a volume percentage of said ceramic superconductor in the range between about fifty five and sixty percent of said superconductor composite.

13. The magnetic bearing system of claim 11 wherein said ceramic superconductor powder has a median particle size in the range between 600 and 800 microns.

14. The magnetic bearing system of claim 1, wherein said means for generating a magnetic field is a cylindrical magnet magnetized along the axis of said cylindrical magnet, said cylindrical magnet mounted coaxially with said axis of rotation of said relatively rotatable members.

15. The magnetic bearing system of claim 8, wherein said means for generating said magnetic fields is a pair of cylindrical magnets magnetized along their respective axes said cylindrical magnets mounted coaxially with said axis of rotation of said relatively rotatable members.

16. The magnetic bearing system of claim 1, wherein said member including said means for generating said magnetic field is a rotating assembly and said member including said disk of superconductor composite is a housing assembly containing said rotating assembly.

17. The magnetic bearing system of claim 8, wherein said member including said means for generating said magnetic fields is a rotating assembly.

* * * * *